(12) United States Patent
Boga et al.

(10) Patent No.: US 12,204,461 B2
(45) Date of Patent: Jan. 21, 2025

(54) APPARATUS, SYSTEM, AND METHOD FOR SECURE MEMORY ACCESS CONTROL

(71) Applicant: Intel Corporation, Santa Clara, CA (US)

(72) Inventors: Siva Bhanu Krishna Boga, Folsom, CA (US); William John Bainbridge, Palo Alto, CA (US); Maulik L. Dhada, Hillsboro, OR (US); Boris Dolgunov, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 17/304,834

(22) Filed: Jun. 25, 2021

(65) Prior Publication Data

US 2022/0414022 A1    Dec. 29, 2022

(51) Int. Cl.
   *G06F 12/14* (2006.01)
   *G06F 12/1027* (2016.01)
   *G06F 13/16* (2006.01)

(52) U.S. Cl.
   CPC ........ *G06F 12/145* (2013.01); *G06F 12/1027* (2013.01); *G06F 12/1441* (2013.01); *G06F 12/1458* (2013.01); *G06F 13/1668* (2013.01)

(58) Field of Classification Search
   None
   See application file for complete search history.

(56) References Cited

U.S. PATENT DOCUMENTS

| | | | | |
|---|---|---|---|---|
| 7,698,522 B1* | 4/2010 | Barnes | ............... | G06F 12/1491 |
| | | | | 711/163 |
| 11,461,247 B1* | 10/2022 | Bolbenes | ............ | G06F 12/1475 |
| 2011/0271075 A1* | 11/2011 | Ahn | ................... | G06F 12/10 |
| | | | | 711/206 |
| 2018/0011651 A1* | 1/2018 | Sankaran | ............ | G06F 12/1009 |
| 2021/0056042 A1* | 2/2021 | Arora | ................. | G06F 12/1027 |
| 2021/0318812 A1* | 10/2021 | Lidman | ................ | G06F 3/0622 |
| 2023/0185733 A1* | 6/2023 | Parker | ................ | G06F 12/1425 |
| | | | | 726/26 |
| 2023/0205709 A1* | 6/2023 | Parker | ................ | G06F 12/1475 |
| | | | | 711/163 |

(Continued)

*Primary Examiner* — Charles Rones
*Assistant Examiner* — Ryan Dare
(74) *Attorney, Agent, or Firm* — Nicholson De Vos Webster & Elliott LLP

(57) ABSTRACT

In an embodiment, an apparatus includes a memory access controller to be coupled to a memory and a memory management unit (MMU) coupled to the memory access controller. The MMU is to receive a memory transaction comprising an original transaction security attribute from a first device; responsive to the memory transaction comprising a first physical address of the memory, transmit the memory transaction to the memory access controller; and responsive to the memory transaction comprising a virtual address, generate a translated memory transaction comprising a translated physical address of the memory based on the virtual address and a translated transaction security attribute and transmit the translated memory transaction to the memory access controller, the translated physical address and the translated transaction security attribute associated with an operating system (OS) memory region of the memory associated with an OS. Other embodiments are described and claimed.

20 Claims, 13 Drawing Sheets

(56) References Cited

U.S. PATENT DOCUMENTS

| | | | |
|---|---|---|---|
| 2023/0236987 A1* | 7/2023 | Elad | G06F 12/10 |
| | | | 711/202 |
| 2023/0342303 A1* | 10/2023 | Grisenthwaite | G06F 12/1441 |
| 2024/0193260 A1* | 6/2024 | Thomas | G06F 21/57 |

* cited by examiner

APPARATUS, SYSTEM, AND METHOD FOR SECURE MEMORY ACCESS CONTROL

TECHNICAL FIELD

Embodiments related to secure memory access control in computing systems.

BACKGROUND

In computing systems, such as for example systems on chip (SoC), some devices may use stolen memory regions in a memory to store their data and firmware. Access to an operating system (OS) memory region of the memory is typically protected using an input/output memory management unit (IOMMU). In many cases, when a device generates a memory transaction to access its stolen memory region, the memory transaction includes the physical address of the location in the memory and a root space tag in a special root space. The root space tag is used by the memory access control mechanism to enable the memory transaction to bypass the IOMMU and access the physical memory location in the stolen memory region.

A device in the computing system may be able to maliciously configure the special root space to bypass IOMMU protection and access kernel/hypervisor memory. The memory access control mechanism typically performs a special root space check to ensure that memory transactions including the root space tag only target the stolen memory region and do not target any memory that is not mapped to a stolen memory region. Devices having stolen memory regions in the memory may seek to access memory locations outside of its stolen memory region by bypassing the IOMMU with the use of a physical address outside its stolen memory region and the root space tag. A device may be configurable by a guest operating system to enable such malicious accesses. A guest operating system may be able to maliciously reconfigure stolen memory region configuration registers to virtual machine memory (VMM). This may enable a device to bypass IOMMU protection and allow the guest OS to receive privilege escalation. In addition, the use of the root space tag may involve allocation of an additional field in the transport protocol, may increase protocol complexity, and impact performance of the computing system.

DETAILED DESCRIPTION

Figure 1:
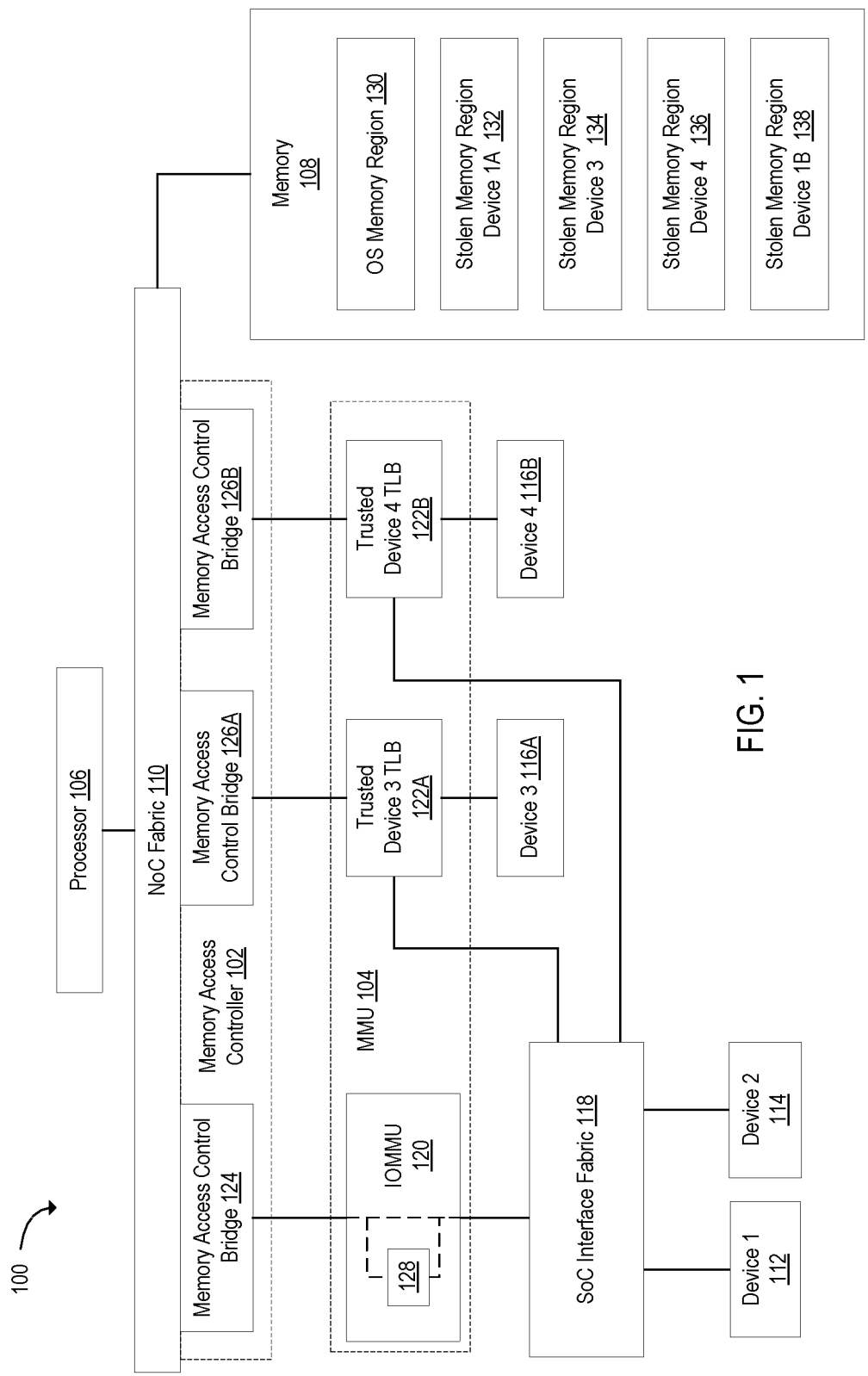
FIG. 1 is a block diagram representation of a system including an embodiment of a memory access controller and an embodiment of a memory management unit (MMU).

In computing systems, devices often use stolen memory regions in a memory to store their data and firmware. Each stolen memory region in the memory is associated with a specific device in the computing system. The memory also includes an operating system (OS) memory region. A memory access controller is used to protect each of the stolen memory region such that only memory transactions generated by the device associated with a stolen memory region are allowed to access that stolen memory region. The memory access controller also protects the OS memory region from unauthorized access by potentially malicious devices.

When a device generates a memory transaction to access a physical address in its stolen memory region, the memory transaction includes a physical address of the memory location in the stolen memory region that the device wishes to access and a transaction security attribute. The transaction security attribute is associated with the device and the stolen memory region associated with the device. The device transmits the memory transaction to the memory management unit (MMU) for transmission to the memory access controller.

When a device generates a memory transaction to access a physical address in the OS memory region, the device generates a memory transaction including a virtual address associated with the memory location in the OS memory region that the device wishes to access and the transaction security attribute that is associated with the device. The MMU receives the memory transaction from the device, validates the transaction security attribute associated with the device, and generates a translated memory transaction for transmission to the memory access controller. The translated memory transaction includes a translated physical address based on the virtual address and a translated transaction security attribute. The translated physical address is the physical address of the OS memory location that the device wishes to access and the translated security attribute is associated with the OS memory region. The translated transaction security attribute is provided by the MMU. The same translated transaction security attribute is used in all translated memory transactions. The device does not have access to the physical address of the OS memory region or to the translated transaction security attribute. The MMU transmits the translated memory transaction to the memory access controller.

When the memory access controller receives a memory transaction from the MMU, the memory transaction includes a physical address of the memory and a transaction security attribute. There is no additional data in the memory transaction indicating whether the memory transaction is seeking access to a stolen memory region or the OS memory region.

The memory access controller implements memory access control using subtractive decoding. The memory access controller first checks to see if the memory transaction is seeking access to a stolen memory region by determining whether the physical address in the memory transaction corresponds to a physical address of a stolen memory region. If the memory access controller determines that the memory transaction is seeking access to a stolen region, the memory access controller checks the transaction security attribute to ensure that the transaction security attribute corresponds to the stolen memory region containing the physical address in the memory transaction as a condition of allowing the memory transaction to access the stolen memory region.

If the memory access controller determines that the memory transaction is not seeking access to a stolen memory region, the memory access controller determines whether the transaction security attribute in the memory transaction is the translated transaction security attribute provided by the MMU. The memory access controller allows the memory transaction to access the OS memory region if the memory access controller determines that the transaction security attribute is the translated transaction security attribute.

Referring to FIG. 1 a block diagram representation of a system 100 including an embodiment of a memory access controller 102 and an embodiment of a memory management unit (MMU) 104 is shown. The system 100 may be at least a portion of, for example, a data center, a server computer, a desktop computer, or a laptop computer. The system 100 includes a processor 106, a memory 108, the memory access controller 102 and the MMU 104. In an embodiment, the processor 106, the memory 108, the memory access controller 102, and the MMU 104 are configured to be communicatively coupled via a network on chip (NoC) fabric 110. In an embodiment, the memory and the memory access controller are to be coupled via at least one of a NoC fabric, a memory fabric, and a memory bus. In an embodiment, the memory access controller 102, and the MMU 104 are components of a system on chip (SoC). In an embodiment, the processor 106, the memory 108, the memory access controller 102 and the MMU 104 are components of a system on chip (SoC). The processor 106 includes one or more central processing units (CPU). An operating system (OS) manages the operation of the processor 106.

One or more devices 112, 114, 116A, 116B are configured to be communicatively coupled to the MMU 104. In an embodiment, the one or more of the devices 112, 114, 116A, 116B are coupled to the MMU 104. In an embodiment, the one or more of the devices 112, 114, 116A, 116B are removeably coupled to the MMU 104. In an embodiment one or more of the devices 112, 114 are configured to be communicatively coupled to the MMU 104 via a SoC interface fabric 118. In an embodiment, one or more of the devices 116A, 116B are configured to be coupled to the MMU 104. Examples of the devices 112, 114, 116A, 116B include but are not limited to a central processing unit (CPU), a graphic processing unit (GPU), a phase-locked loop (PLL) unit, an input/output (I/O) unit, an application specific integrated circuit (ASIC) unit, a field-programmable gate array unit, a graphics card, a III-V unit, an accelerator, and a three-dimensional IC (3D IC).

In an embodiment, the MMU 104 includes an input/output memory management unit (IOMMU) 120 and one or more trusted device translation lookaside buffers (TLB) 122A, 122B. In an embodiment, the IOMMU 120 includes an address processor 128. While a configuration of an embodiment of the MMU 104 has been described, in alternative embodiments, alternative configurations of the MMU 104 may be used.

In an embodiment, one or more devices 112, 114, 116A, 116B are communicatively coupled to the MMU 104. In an embodiment, one or more devices 112, 114, 116A, 116B are removeably communicatively coupled to the MMU 104. In an embodiment, one of more of the devices 112, 114 are communicatively coupled to the IOMMU 120 via the SoC interface fabric 118. In an embodiment, one or more of the devices 116A, 116B are communicatively coupled to an associated trusted device TLB 122A, 122B. In alternative embodiments, two or more devices may be communicatively coupled to a single trusted TLB (not shown). While four devices 112, 114, 116A, 116B are shown, alternative embodiments may include a fewer or greater number of devices.

In an embodiment, the memory access controller 102 includes one or more memory access control bridges 124, 126A, 126B. In an embodiment, the IOMMU 120 is communicatively coupled to a memory access control bridge 124. In an embodiment, each trusted device TLB 122A, 122B is communicatively coupled to an associated memory access control bridge 126A, 126B. In an embodiment, the IOMMU 120 and the one or more trusted device TLBs are communicatively coupled to a single memory access control bridge (not shown). In an embodiment, two or more trusted device TLBs are communicatively coupled to a single memory access control bridge (not shown). While a number of configurations of the memory access controller 102 have been described, in alternative embodiments, alternative configurations of the memory access controller 102 may be used.

The memory 108 includes an OS memory region 130 and one or more stolen memory regions 132, 134, 136, 138. The OS memory region 130 is accessible by the processor 106. The MMU 104 and the memory access controller 102 cooperate to ensure that only legitimate memory transactions generated by legitimate device 112, 114, 116A, 116B are allowed to access the OS memory region 130. In an embodiment, the OS memory region 130 is a hypervisor memory region. The MMU 104 and the memory access controller 102 cooperate to protect the hypervisor memory region. In an embodiment, the MMU 104 and the memory access controller 102 cooperate to protect the hypervisor memory region from memory transactions generated by potentially malicious guest OS.

In an embodiment, each of the stolen memory regions 132, 134, 136, 138 are associated with and only accessible by a specific device 112, 116A, 116B. For example, the stolen memory region 132 is associated with the device 112 and is only accessible by the device 112. In other words, only memory transactions generated by device 112 are allowed to access the stolen memory regions 132. The stolen memory region 134 is associated with the device 116A and is only accessible by the device 116A and the stolen memory region 136 is associated with the device 116B and is only accessible by the device 116B. In an embodiment, a single device 112 may be associated with more than one stolen region 132 138. For example, the stolen memory regions 132, 138 are associated with the device 112 and are only accessible by the device 112. The MMU 104 and the memory access controller 102 cooperate to ensure that only memory transactions generated by a specific device 112, 114, 116A, 116B are allowed to access the stolen memory region 132, 134, 136, 138 associated with that device 112, 114, 116A, 116B.

While a configuration of the system 100 has been described alternative embodiments may have different configurations. While the system 100 is described as include the components illustrated in FIG. 1, alternative embodiments may include additional components that facilitate the operation of the system 100.

Figure 2:
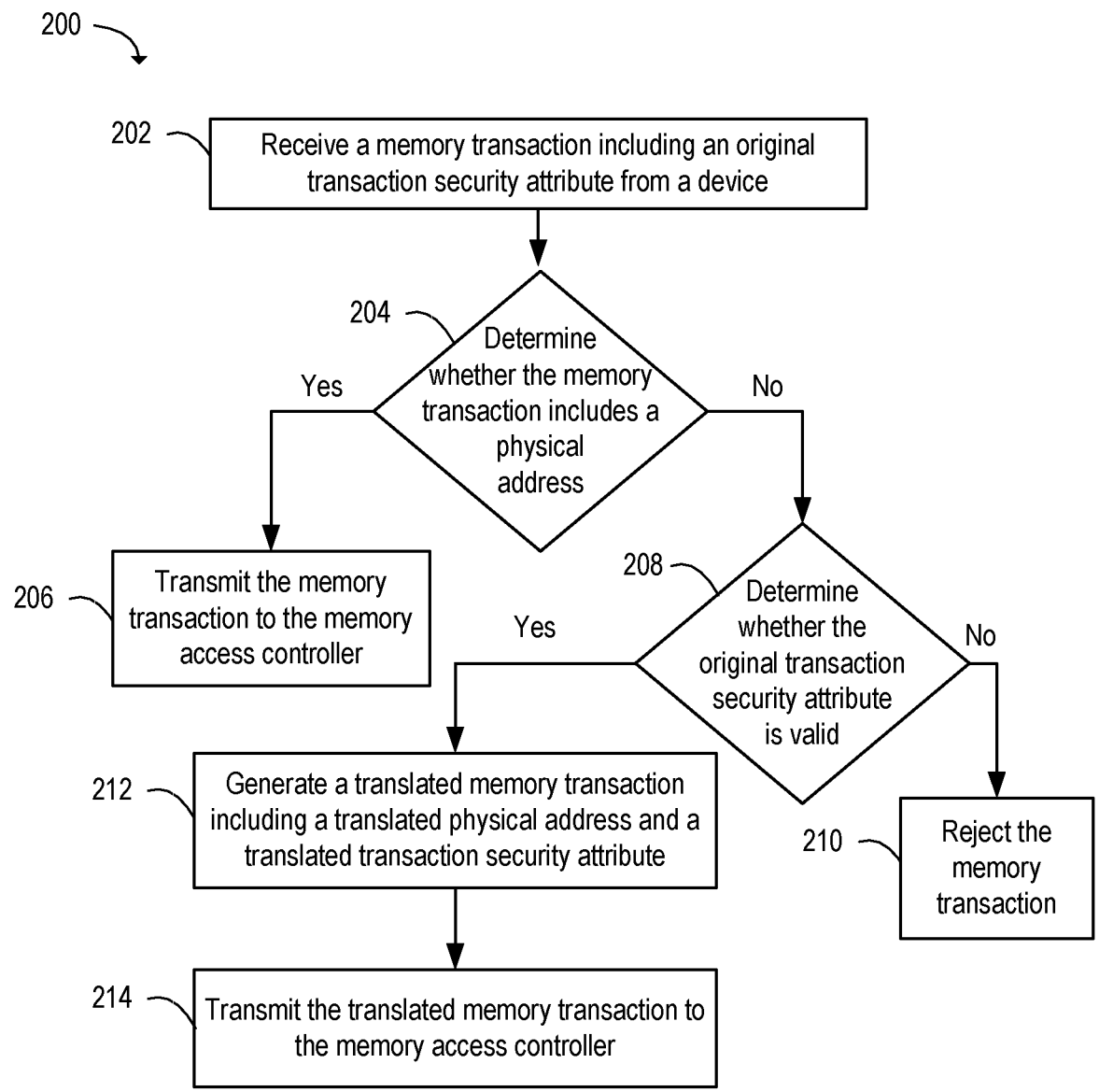
FIG. 2 is a flow chart representation of an embodiment of method of implementing secure memory access control.

Referring to FIG. 2, a flow chart representation of an embodiment of a method 200 of implementing secure memory access control is shown. The method 200 is performed by the IOMMU 120. The method 200 may be performed by the IOMMU 120 in combination with additional components of the system 100. The method 200 may be performed by hardware circuitry, firmware, software, and/or combinations thereof.

At 202, the IOMMU 120 receives a memory transaction including an original transaction security attribute from a device 112, 114. In an embodiment, the original transaction security attribute is a security attribute of an initiator (SAI). Each device 112, 114 includes the SAI associated with that device 112, 114 in each of the memory transactions generated by that device 112, 114.

At 204, the IOMMU 120 determines whether the memory transaction includes a physical address of the memory 108. Each stolen memory region 132, 134, 136, 138 includes a plurality of physical address locations in the memory. When a device 112 generates a memory transaction to access a memory location in the stolen memory region 132, 138 associated with that device 112, the device 112 includes the physical address of that memory location in the memory transaction. The device 112 only includes a physical address in the memory transaction if the device 112 wishes to access its stolen memory region 130, 138. If at 204, the IOMMU 120 determines that the memory transaction includes a physical address, the IOMMU 120 transmits the received memory transaction including the original transaction security attribute and the physical address to the memory access controller 102 at 206. In an embodiment, the IOMMU 120 is coupled to an associated memory access control bridge 124. The IOMMU 120 transmits the received memory transaction including the original transaction security attribute and the physical address to the associated memory access control bridge 124. In an embodiment, the address processor 128 generates the translated memory transaction. In an embodiment, bypassing the IOMMU 120 occurs when the IOMMU 120 receives a memory transaction, bypasses the address processor 128 and transmits the received memory transaction to the memory access controller 102. The memory access control bridge 124 determines whether to allow the memory transaction to access the physical address in the memory 108.

The OS memory region 130 includes a plurality of physical address locations in the memory 108. When a device 112, 114 generates a memory transaction to access the OS memory region 130, the device 112, 114 includes a virtual address associated with the physical memory location that the device 112, 114 is seeking to access in the memory transaction. The device 112, 114 does not possess information regarding the physical address of the memory location in the OS memory region that the device 112, 114 is seeking to access in the memory transaction. If the IOMMU 120 determines that the memory transaction does not includes a physical address at 204, the IOMMU 120 assumes that the memory transaction is seeking access to the OS memory region 130.

At 208, the IOMMU 120 determines whether the original transaction security attribute in the received memory transaction is valid. In an embodiment, the IOMMU 120 maintains a list of the original transaction security attributes associated with each of the devices 112, 114, 116A, 116B that are permitted access to the OS memory region 130. The IOMMU 120 checks to see if the original transaction security attribute in the received memory transaction is on the list of original transaction security attributes. If the original transaction security attribute in the received memory transaction is not on the list, the IOMMU 120 determines that the memory transaction was not received from a device that is permitted to access the OS memory region 130 and rejects the memory transaction at 210.

If the original transaction security attribute in the received memory transaction is on the list, the IOMMU 120 determines that the memory transaction was received from a device that is permitted to access the OS memory region 130 and generates a translated memory transaction including a translated physical address and a translated transaction security attribute at 212. The translated physical address is the physical address of the memory location in the OS memory region 130 that corresponds to the virtual memory address provided by the device 112, 114. The translated transaction security attribute is associated with the plurality of physical addresses of the OS memory region 130 and enables a translated memory transaction to access the OS memory region 130. In an embodiment, the translated transaction security attribute is a special SAI associated with the OS memory region 130. The same translated transaction security attribute is used in all translated memory transactions. In an embodiment, the special SAI is used in all translated memory transactions.

The devices 112, 114 seeking to access the OS memory region 130 do not have access to the translated transaction security attribute. Since the devices 112, 114 do not have access to the physical addresses of the OS memory region 130 and the translated transaction security attribute, the OS memory region 130 may be protected from unauthorized and/or malicious accesses to the OS memory region 130 by the devices 112, 114. The IOMMU 120 provides a first level of protection of the OS memory region 130 from unauthorized accesses by the devices 112, 114.

At 214, the IOMMU 120 transmits the translated memory transaction including the translated physical address and the translated transaction security attribute to the memory access controller 102. In an embodiment, the IOMMU 120 is coupled to an associated memory control access bridge 124. The IOMMU 120 transmits the translated memory transaction including the translated physical address and the translated transaction security attribute to the memory access control bridge 124. The memory access control bridge 124 determines whether to allow the translated memory transaction to access the physical address in the memory 108.

Figure 3:
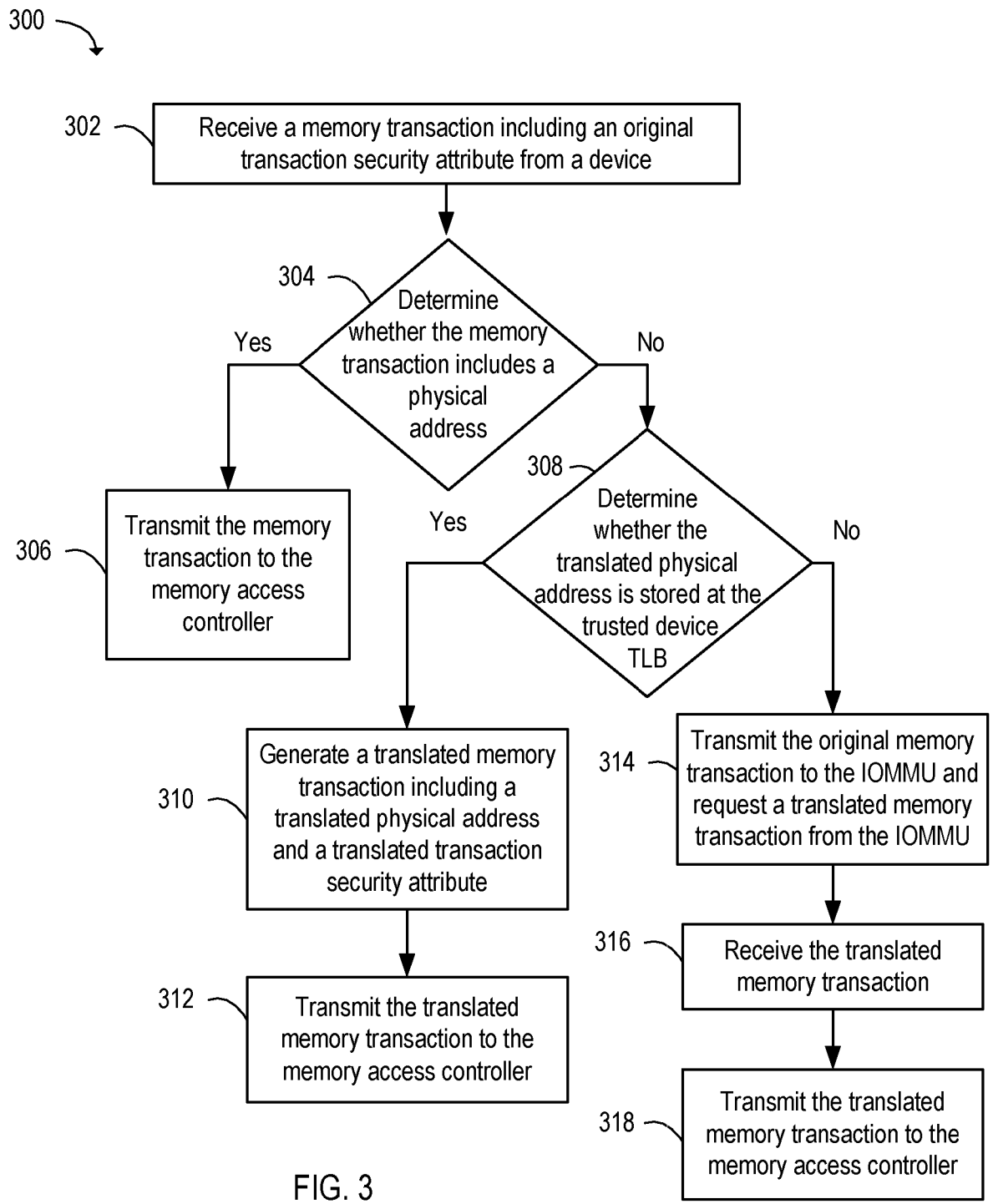
FIG. 3 is a flow chart representation of an embodiment of a method of implementing secure memory access control.

Referring to FIG. 3, a flow chart representation of an embodiment of a method 300 of implementing secure memory access control is shown. The method 300 is performed by a trusted device TLB 122A, 122B. The method 300 may be performed by a trusted device TLB 122A, 122B in combination with additional components of the system 100. The method 300 may be performed by hardware circuitry, firmware, software, and/or combinations thereof.

At 302, a trusted device TLB 122A, 122B receives a memory transaction including an original transaction security attribute from the associated device 116A, 116B. In an embodiment, the original transaction security attribute is a SAI. Each device 116A, 116B includes the SAI associated with that device 116A, 116B in each memory transaction generated by that device 116A, 116B.

At 304, the trusted device TLB 122A, 122B determines whether the memory transaction includes a physical address of the memory 108. Each stolen memory region 132, 134, 136, 138 includes a plurality of physical address locations in the memory. When a device 116A, 116B generates a memory transaction to access a memory location in the stolen memory region 134, 136 associated with that device 116A, 116B, the device 116A, 116B includes the physical address of that memory location in the memory transaction. The device 116A, 116bB only includes a physical address in the memory transaction if the device 116A, 116B wishes to access its stolen memory region 134, 136. If at 304, the trusted device TLB 122A, 122B determines that the memory transaction includes a physical address, the trusted device TLB 122A, 122B transmits the received memory transaction including the original transaction security attribute and the physical address to the memory access controller at 306.

In an embodiment, each trusted device TLB 122A, 122B is coupled to an associated memory access control bridge 126A, 126B. The trusted device TLB 122A, 122B transmits the received memory transaction including the original transaction security attribute and the physical address to the associated memory access control bridge 126A, 126B. The memory access control bridge 126A, 126B determines whether to allow the memory transaction to access the physical address in the memory 108.

The OS memory region 130 includes a plurality of physical address locations in the memory 108. When a device 116A, 116B generates a memory transaction to access the OS memory region 130, the device 116A, 116B includes a virtual address associated with the physical memory location that the device 116A, 116B is seeking to access in the memory transaction. The device 116A, 116B does not possess information regarding the physical address of the memory location in the OS memory region that the device 116A, 116B is seeking to access in the memory transaction. If the trusted device TLB 122A, 122B determines that the memory transaction does not includes a physical address at 304, the trusted device TLB 122A, 122B assumes that the memory transaction is seeking access to the OS memory region 130.

At 308, the trusted device TLB 122A, 122B determines whether the translated physical address associated with the virtual address in the memory transaction is stored at the trusted device TLB 122A, 122B. The trusted device TLB 122A, 122B stores a number of relationships between virtual addresses and translated physical addresses used in past memory transactions generated by the associated device 116A, 166B to access the OS memory region 130.

If the trusted device TLB 122A, 122B determines that the translated physical address corresponding to the virtual address in the received memory transaction is stored at the trusted device TLB 122A, 122B at 308, the trusted device TLB 122A, 122B generates a translated memory transaction including the translated physical address and a translated transaction security attribute at 310. The trusted device TLB 122A, 122B has a copy of the translated transaction security attribute that was previously supplied to the trusted device TLB 122A, 122B by the IOMMU 120 during the processing of a previous memory transaction. The translated transaction security attribute is associated with the plurality of physical addresses of the OS memory region 130 and enables a translated memory transaction to access the OS memory region 130. In an embodiment, the translated transaction security attribute is a special SAI associated with the OS memory region 130. The same translated transaction security attribute is used in all translated memory transactions. In an embodiment, the special SAI is used in all translated memory transactions.

The devices 116A, 116B seeking to access the OS memory region 130 do not have access to the translated transaction security attribute. Since the devices 116A, 116B do not have access to the physical addresses of the OS memory region 130 and the translated transaction security attribute, the OS memory region 130 may be protected from unauthorized and/or malicious accesses to the OS memory region 130 by the devices 116A, 116B. The trusted devices TLB 122A, 122B provides a first level of protection of the OS memory region 130 from unauthorized accesses by the devices 116A, 116B.

At 312, the trusted device TLB 122A, 122B transmits the translated memory transaction including the translated physical address and the translated transaction security attribute to the memory access controller 102. In an embodiment, each trusted device TLB 122A, 122B is coupled to an associated memory control access bridge 126A, 126B. The trusted device TLB 122A, 122B transmits the translated memory transaction including the translated physical address and the translated transaction security attribute to the associated memory access control bridge 126A, 126B. The memory access control bridge 126A, 126B determines whether to allow the memory transaction to access the physical address in the memory 108.

If the trusted device TLB 122A, 122B determines that the translated physical address corresponding to the virtual address in the received memory transaction is not stored at the trusted device TLB 122A, 122B at 308, the trusted device TLB 122A, 122B transmits the original memory transaction to the IOMMU 120 and requests a translated memory transaction from the IOMMU 120 at 314. Since the IOMMU 120 receives the request for the translated memory transaction from a trusted device TLB 122A, 122B, the IOMMU 120 does not perform a validation of the original transaction security attribute in the original memory transaction.

The IOMMU 120 generates a translated memory transaction including a translated physical address and a translated transaction security attribute. The translated physical address is the physical address of the memory location in the OS memory region 130 that corresponds to the virtual memory address in the original memory transaction. The translated transaction security attribute is associated with the plurality of physical addresses of the OS memory region 130 and enables a translated memory transaction to access the OS memory region 130. In an embodiment, the translated transaction security attribute is a special SAI associated with the OS memory region 130.

The devices 116A, 116B seeking to access the OS memory region 130 do not have access to the translated transaction security attribute. Since the devices 116A, 116B do not have access to the physical addresses of the OS memory region 130 and the translated transaction security attribute, the OS memory region 130 may be protected from unauthorized and/or malicious accesses to the OS memory region 130 by the devices 116A, 116B. The IOMMU 120 provides a first level of protection of the OS memory region 130 from unauthorized accesses by the devices 116A, 116B.

The IOMMU 130 transmits the translated memory transaction including the translated physical address and the translated transaction security attribute to the trusted device TLB 122A, 122B. The trusted device TLB 122A, 122B receives the translated memory transaction including the translated physical address and the translated transaction security attribute at 316.

At 318, the trusted device TLB 122A, 122B transmits the received translated memory transaction including the translated physical address and the translated transaction security attribute to the memory access controller 102. In an embodiment, each trusted device TLB 122A, 122B is coupled to an associated memory control access bridge 126A, 126B. The trusted device TLB 122A, 122B transmits the translated memory transaction including the translated physical address and the translated transaction security attribute to the associated memory access control bridge 126A, 126B. The memory access control bridge 126A, 126B determines whether to allow the translated memory transaction to access the physical address in the memory 108.

Figure 4:
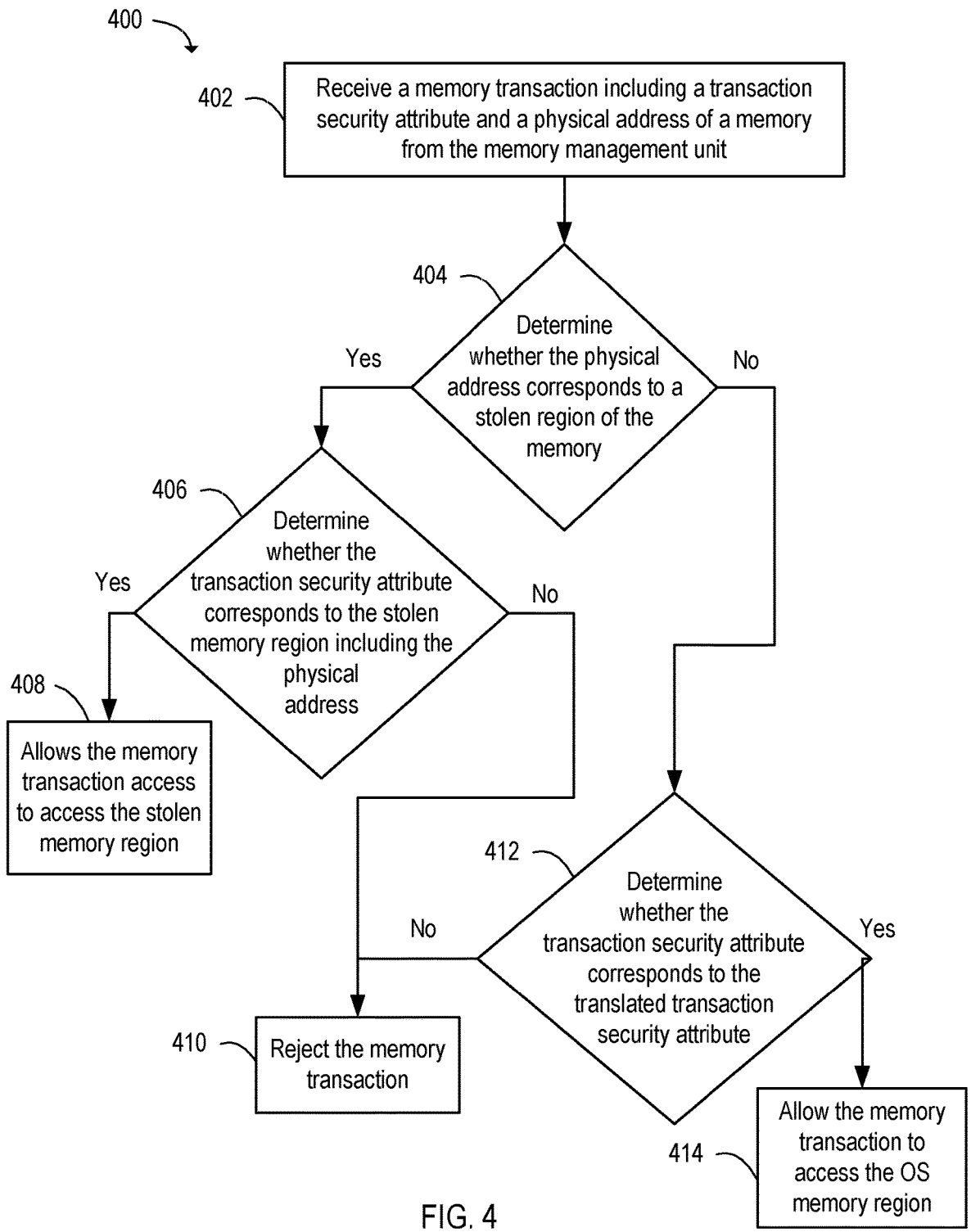
FIG. 4 is a flow chart representation of an embodiment of a method of implementing secure memory access control.

Referring to FIG. 4, a flow chart representation of an embodiment of a method 400 of implementing secure memory access control is shown. The method 400 is performed by the memory access controller 102. The method 400 may be performed by the memory access controller 102 in combination with additional components of the system 100. The method 400 may be performed by hardware circuitry, firmware, software, and/or combinations thereof.

Memory access control is implemented using subtractive decoding. When a memory transaction is received by the memory access controller 102, the memory access controller 102 first checks to see if the memory transaction is seeking access to a stolen memory region 132, 134, 136, 138. If the memory access controller 102 determines that the memory transaction is not seeking access to a stolen memory region 132, 134, 136, 138, the memory access controller determines whether the transaction security attribute in the memory transaction is a translated transaction security attribute that was provided by the IOMMU 120. The memory access controller 102 allows the memory transaction to access the OS memory region 130 if the memory access controller 102 determines that the transaction security attribute in the memory transaction is a translated transaction security attribute. The SoC access control to the kernel memory will rely only on the translated transaction security attribute provided by the IOMMU 120 without using root space. In an embodiment, the translated transaction security attribute is the special SAI provided by the IOMMU 120.

At 402, the memory access controller 102 receives the memory transaction including a transaction security attribute and a physical address of the memory from the MMU 104. The received memory transaction is either an original memory transaction including a physical address and an original transaction security attribute provide by the device 112, 116A, 116B or a translated memory transaction including a translated physical address and a translated transaction security attribute provided by the IOMMU 120.

In an embodiment, the memory transaction is received at a memory access control bridge 124, 126A, 126B. Memory transactions generated by devices 112, 114 that are communicatively coupled to the IOMMU 120 are routed to the memory access control bridge 124 that is communicatively coupled to the IOMMU 120. Memory transactions generated by devices 116A, 116B that are communicatively coupled to an associated trusted device TLB 122A, 122B are routed to the memory access control bridge 126A, 126B that is communicatively coupled to that trusted device TLB 122A, 122B.

At 404, the memory access controller 102 determines whether the physical address in the received memory transaction corresponds to a physical address in a stolen memory region 132, 134, 136, 138. The memory transaction includes a transaction security attribute and a physical address of the memory. However, there is no indication in the memory transaction itself regarding whether the memory transaction is seeking access to the OS memory region 130 or to one of the stolen memory regions 132, 134, 136, 138.

In an embodiment, each memory access control bridge 124, 126A, 126B includes storage. A look up table is stored in the storage. In an embodiment, the look up table includes the physical addresses that are associated with the stolen memory regions 132, 134, 136, 138. The memory access control bridge 124, 126A, 126B uses the look up table to determine whether the physical address in the received memory transaction corresponds to one of the physical addresses in the look up table. If the memory access control bridge 124, 126A, 126B determines that the physical address in the received memory transaction corresponds to a physical address in a stolen memory region 132, 134, 136, 138, the method proceeds to 406.

At 406, the memory access controller 102 determines whether the transaction security attribute in the received memory transaction corresponds to the stolen memory region 132, 134, 136, 138 including the physical address. In an embodiment the look up table stored at each of the memory access control bridges 124, 126A, 126B includes the transaction security attribute associated with the physical addresses in each of the stolen memory regions 132, 134, 136, 138. For example, the stolen memory region 134 may be associated with a device 116A. The stolen region 134 may include a first plurality of physical addresses that are associated with that stolen region 134 and with the device 116A. When the device 116A generates a memory transaction to access its stolen region 134, the device 116A includes an original transaction security attribute. That original transaction security attribute is associated with the first plurality of addresses associated with the stolen region 134. The look up table includes the association between the first plurality of addresses associated with the stolen region 134 and the original transaction security attribute generated by the device 116A associated with the stolen region 134. If the memory access control bridge 124, 126A, 126B determines that the transaction security attribute in the received memory transaction corresponds to the stolen memory region 132, 134, 136, 138 including the physical address, the method proceeds to 408.

At 408, the memory access controller 102 allows the memory transaction to access the stolen memory region. In an embodiment, the memory access control bridge 124, 126A, 126B that received the memory transaction allows the memory transaction to access the physical address location in the stolen memory region 132, 134, 136, 138.

If the memory access control bridge 124, 126A, 126B determines that the transaction security attribute in the received memory transaction does not correspond to the stolen memory region 132, 134, 136, 138 including the physical address, the method proceeds to 410. At 410 the memory access controller 102 rejects the memory transaction In an embodiment, the memory access control bridge 124, 126A, 126B that received the memory transaction rejects the memory transaction and the memory transaction is not allowed to access the memory.

If the memory access controller 102 determines that the physical address in the received memory transaction does not corresponds to a physical address in a stolen memory region 132, 134, 136, 138 at 404, the memory access controller 102 determines whether the transaction security attribute corresponds to the translated transaction security attribute at 412. In an embodiment, the memory access control bridge 124, 126A, 126B that received the memory transaction determines whether the transaction security attribute corresponds to the translated transaction security attribute. The translated transaction security attribute is associated with the plurality of physical addresses of the OS memory region 130. In an embodiment, the translated transaction security attribute is a special SAI associated with the OS memory region 130. The same translated security attribute is used in all translated memory transactions. The translated transaction security attribute is provided by the IOMMU 120. In an embodiment, the special SAI is used in all translated memory transactions. If the memory access control bridge 124, 126A, 126B determines that the transaction security attribute corresponds to the translated transaction security attribute, the memory access control bridge 124, 126A, 126B the method proceeds to 414.

At 414 the memory access controller 102 allows the memory transaction to access the physical address location in the OS memory region 130. In an embodiment, the memory access control bridge 124, 126A, 126B that received the memory transaction allows the memory transaction to access the physical address location in the OS memory region 130.

If the memory access control bridge 124, 126A, 126B determines that the transaction security attribute does not correspond to the translated transaction security attribute, the memory access control bridge 124, 126A, 126B the method proceeds to 410. At 410 the memory access controller 102 rejects the memory transaction In an embodiment, the memory access control bridge 124, 126A, 126B that received the memory transaction rejects the memory transaction and the memory transaction is not allowed to access the memory.

The described embodiments of the memory access controller and implementations of memory access control removes the allocation of an additional field in the transport protocol for use of special root space. In addition, the described embodiments may simplify memory access mechanisms since they rely on a single identifier as opposed to on multiple transaction tags. The SoC access control to the kernel memory relies on the SAI without using root space. The use of the embodiments of the memory access controller may decrease protocol complexity and may improve performance of the computing system.

Figure 5A:
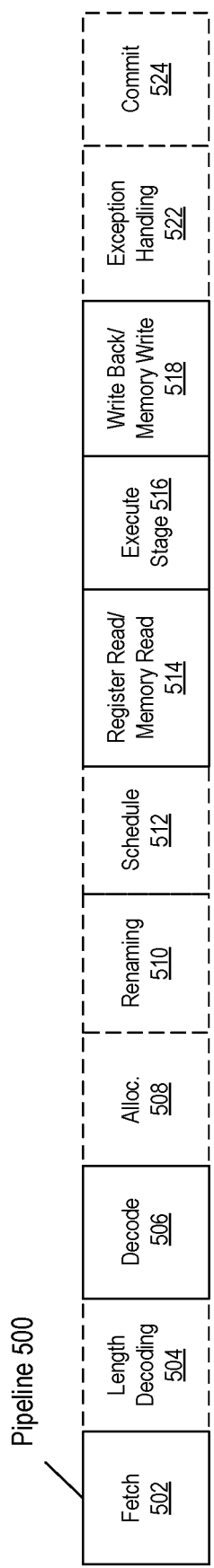
FIG. 5A is a block diagram illustrating both an exemplary in-order pipeline and an exemplary register renaming, out-of-order issue/execution pipeline in accordance with disclosed embodiments.
Figure 5B:
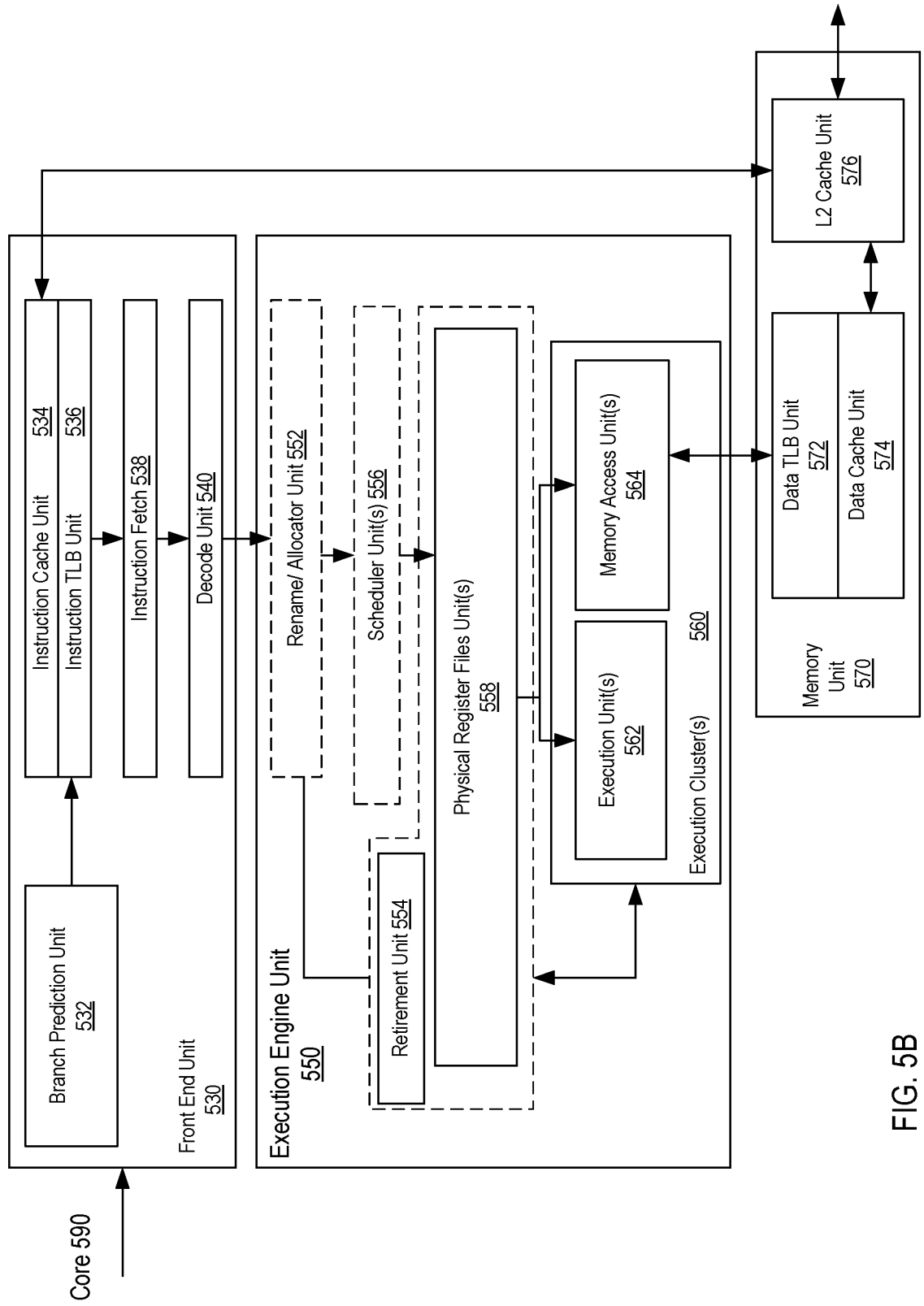
FIG. 5B is a block diagram illustrating both an exemplary embodiment of an in-order architecture core and an exemplary register renaming, out-of-order issue/execution architecture core to be included in a processor in accordance with disclosed embodiments.

FIG. 5A is a block diagram illustrating both an exemplary in-order pipeline and an exemplary register renaming, out-of-order issue/execution pipeline according to disclosed embodiments. FIG. 5B is a block diagram illustrating both an exemplary embodiment of an in-order architecture core and an exemplary register renaming, out-of-order issue/execution architecture core to be included in a processor according to disclosed embodiments. The solid lined boxes in FIGS. 5A and 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. Each of these stages may be configured to handle the non-serializing register write ISA instructions of embodiments described herein.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
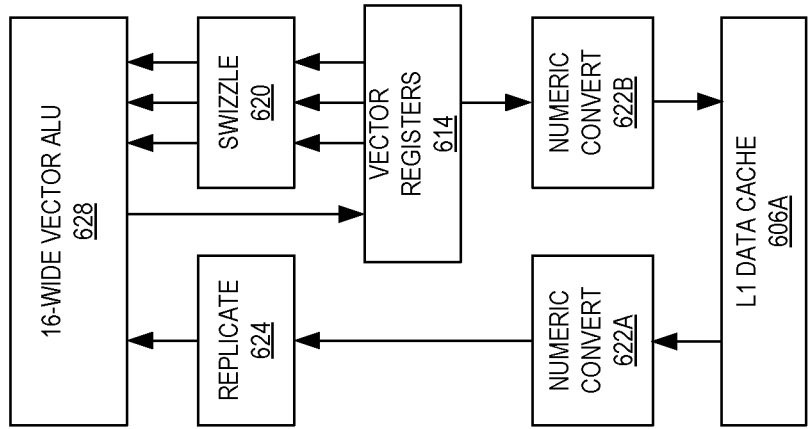
FIG. 6Aa and FIG. 6B illustrate a block diagram of a more specific exemplary in-order core architecture in accordance with disclosed embodiments.
Figure 6A:
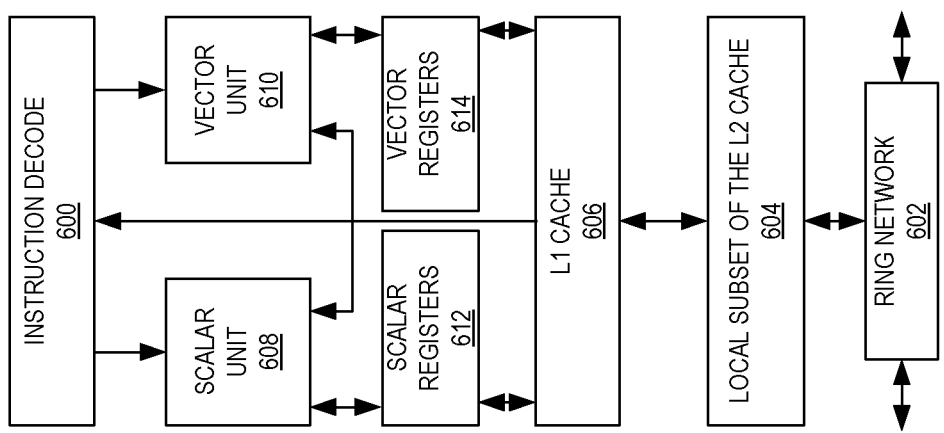

FIGS. 6A and 6B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to disclosed embodiments. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments may use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 6B is an expanded view of part of the processor core in FIG. 6A according to disclosed embodiments. FIG. 6B includes an L1 data cache 606A part of the L1 cache 604, as well as more detail regarding the vector unit 610 and the vector registers 614. Specifically, the vector unit 610 is a 6-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input.

Figure 7:
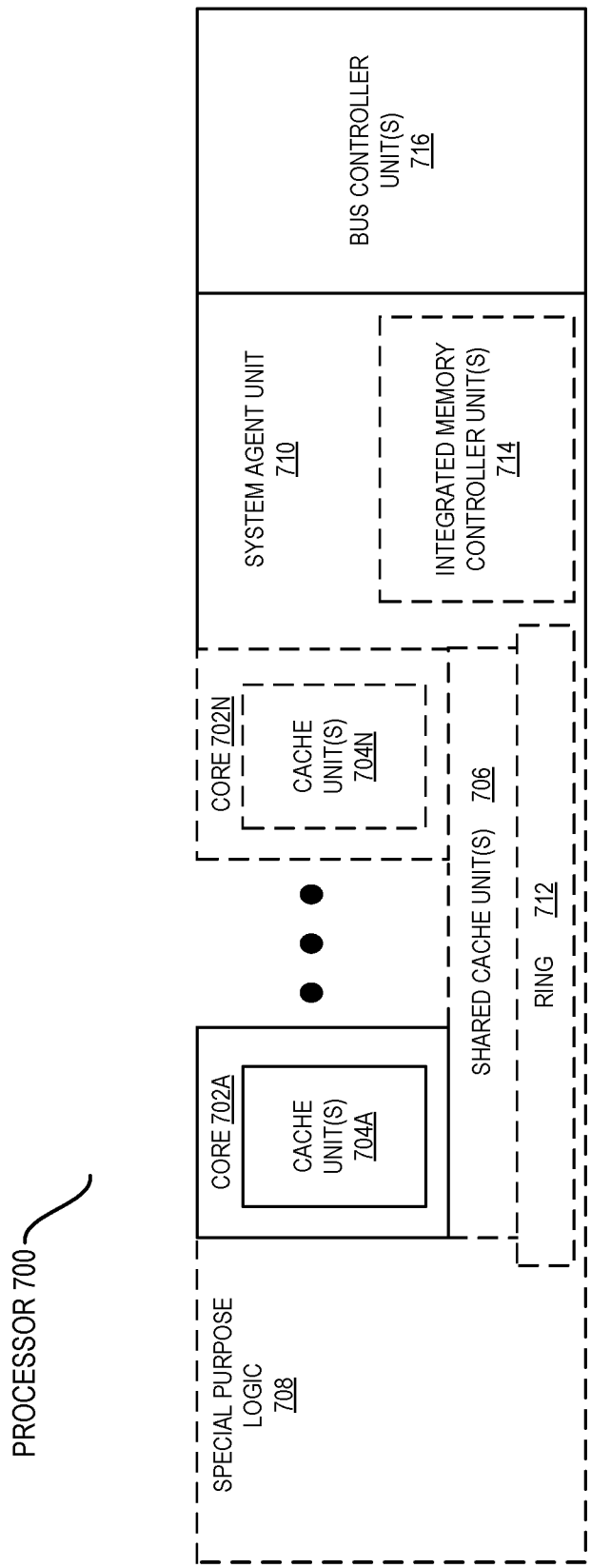
FIG. 7 is a block diagram of a processor that may have more than one core, may have an integrated memory controller, and may have integrated graphics according to disclosed embodiments.

FIG. 7 is a block diagram of a processor 700 that may have more than one core, may have an integrated memory controller, and may have integrated graphics according to disclosed embodiments. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores 704A-N, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the special purpose logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the special purpose logic 708.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
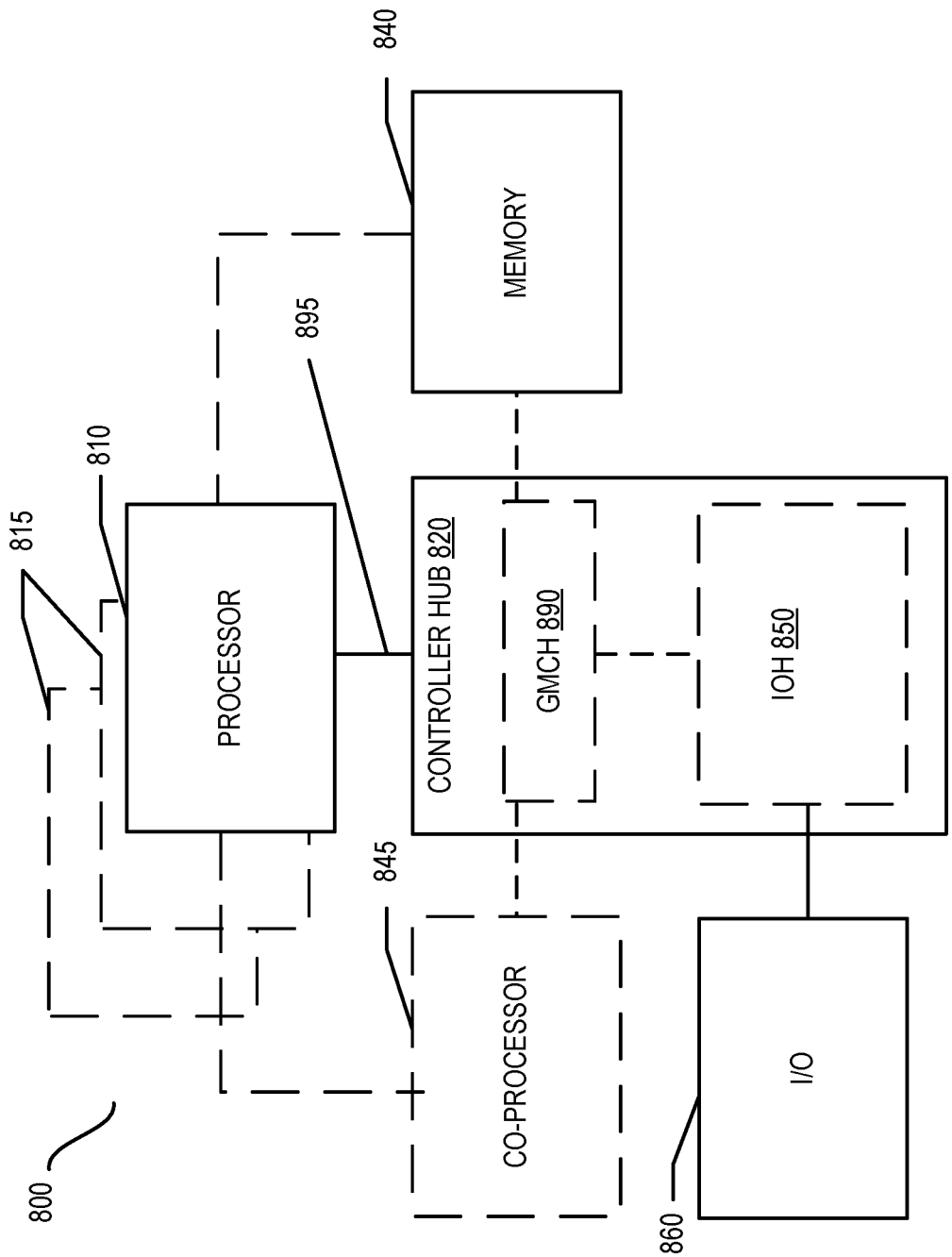
FIG. 8 is a block diagram of a system in accordance with disclosed embodiments.

Referring now to FIG. 8, shown is a block diagram of a system 800 in accordance with one embodiment. The system 800 may include one or more processors 810, 815, which are coupled to a controller hub 820. In one embodiment, the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multidrop bus, such as a frontside bus (FSB), point-to-point interface, or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
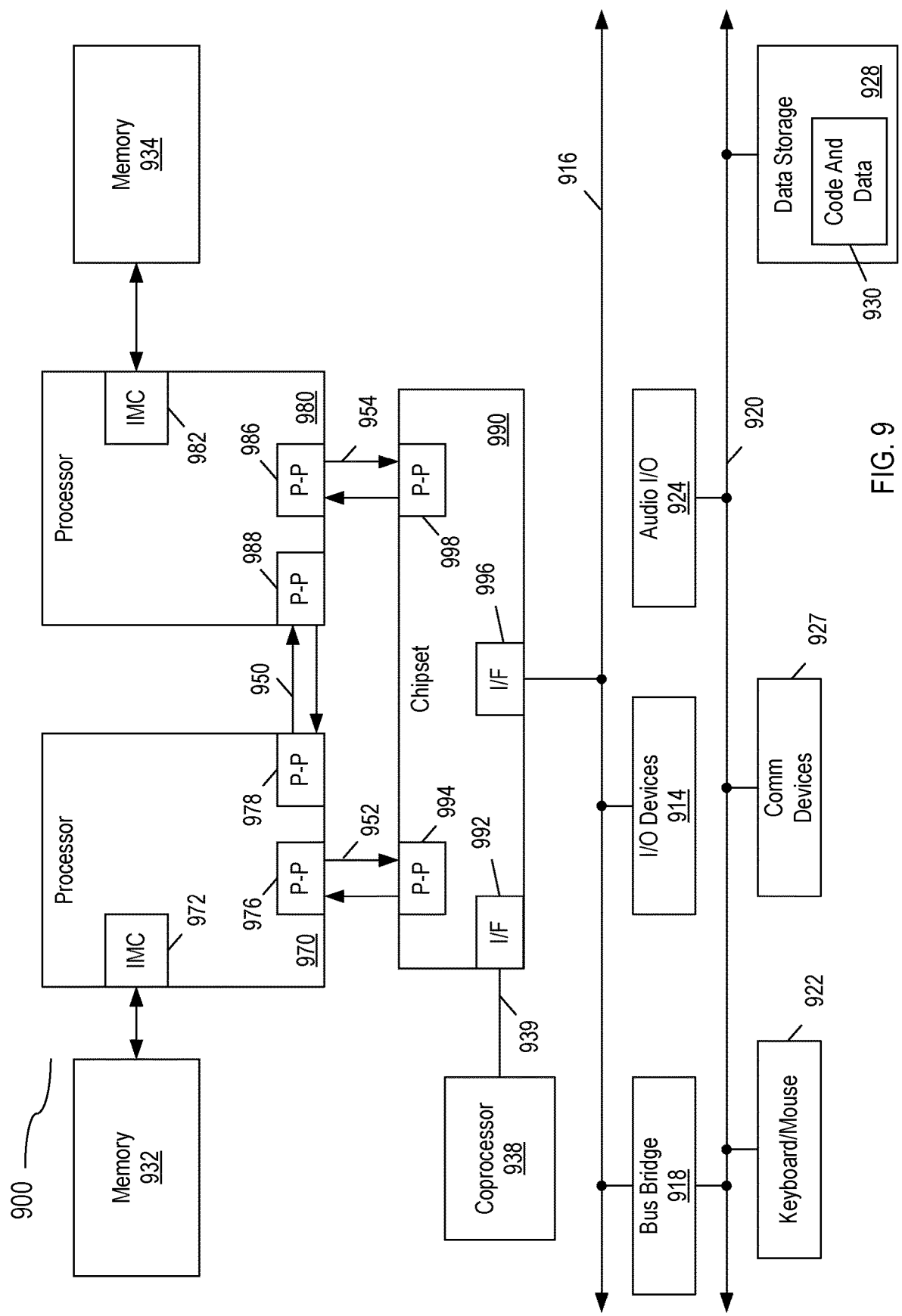
FIG. 9 is a block diagram of a first more specific exemplary system in accordance with disclosed embodiments.

Referring now to FIG. 9, shown is a block diagram of a first more specific exemplary system 900 in accordance with a disclosed embodiment. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment, processors 970 and 980 are respectively processors 810 and 815, while coprocessor 938 is coprocessor 845. In another embodiment, processors 970 and 980 are respectively processor 810 and coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high performance interface 992. In one embodiment, the coprocessor 938 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another I/O interconnect bus, although the scope is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 916. Note that other architectures are possible. For example, instead of the point-to-point architecture of FIG. 9, a system may implement a multi-drop bus or other such architecture.

Figure 10:
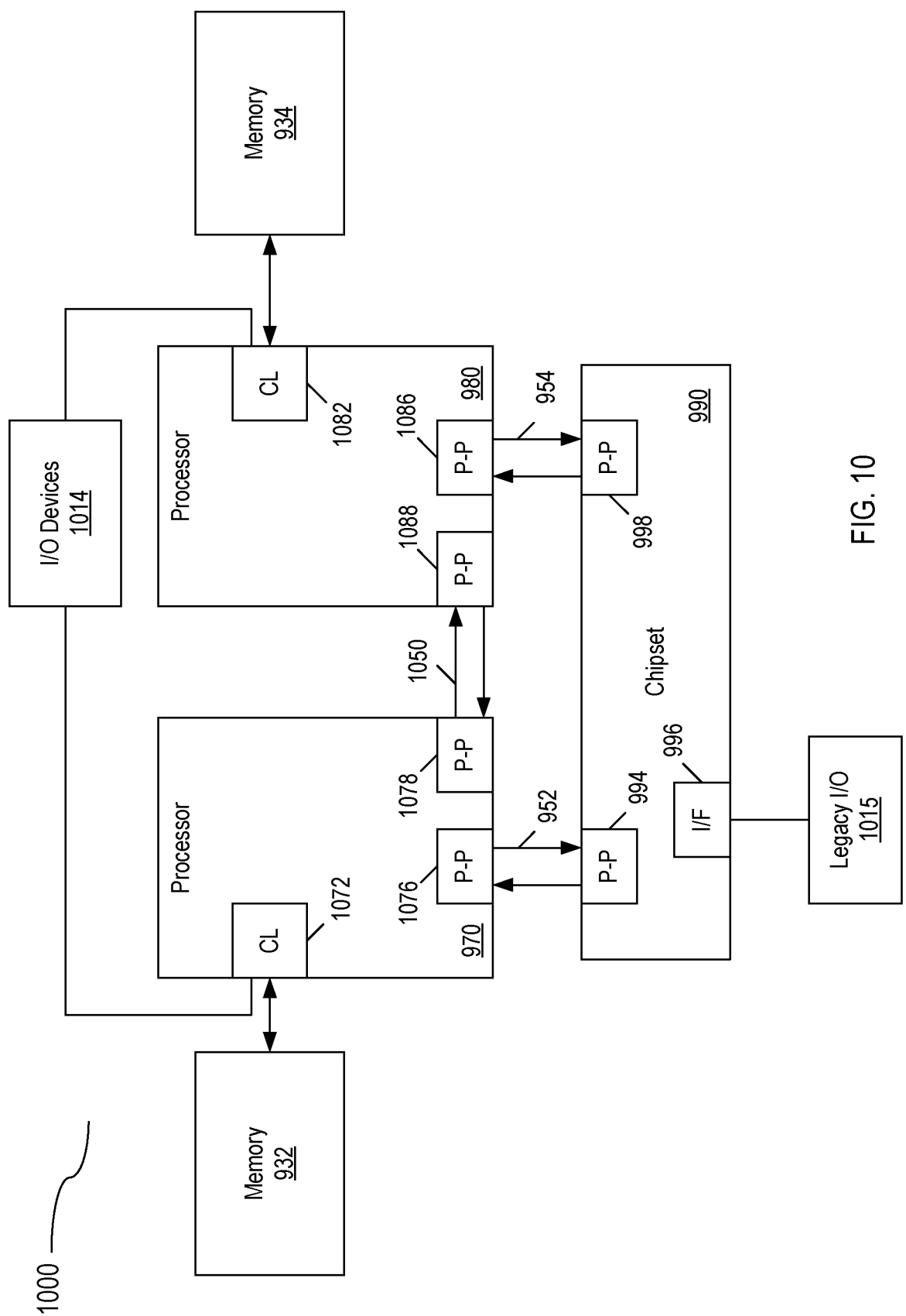
FIG. 10 is a block diagram of a second more specific exemplary system in accordance with disclosed embodiments.

Referring now to FIG. 10, shown is a block diagram of a second more specific exemplary system 1000 in accordance with an embodiment. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 1072 and 1082, respectively. Thus, the CL 1072, 1082 include integrated memory controller units and include I/O control logic. FIG. 10 illustrates that not only are the memories 932, 934 coupled to the CL 1072, 1082, but also that I/O devices 914 are also coupled to the control logic 972, 982. Legacy I/O devices 1015 are coupled to the chipset 990.

Figure 11:
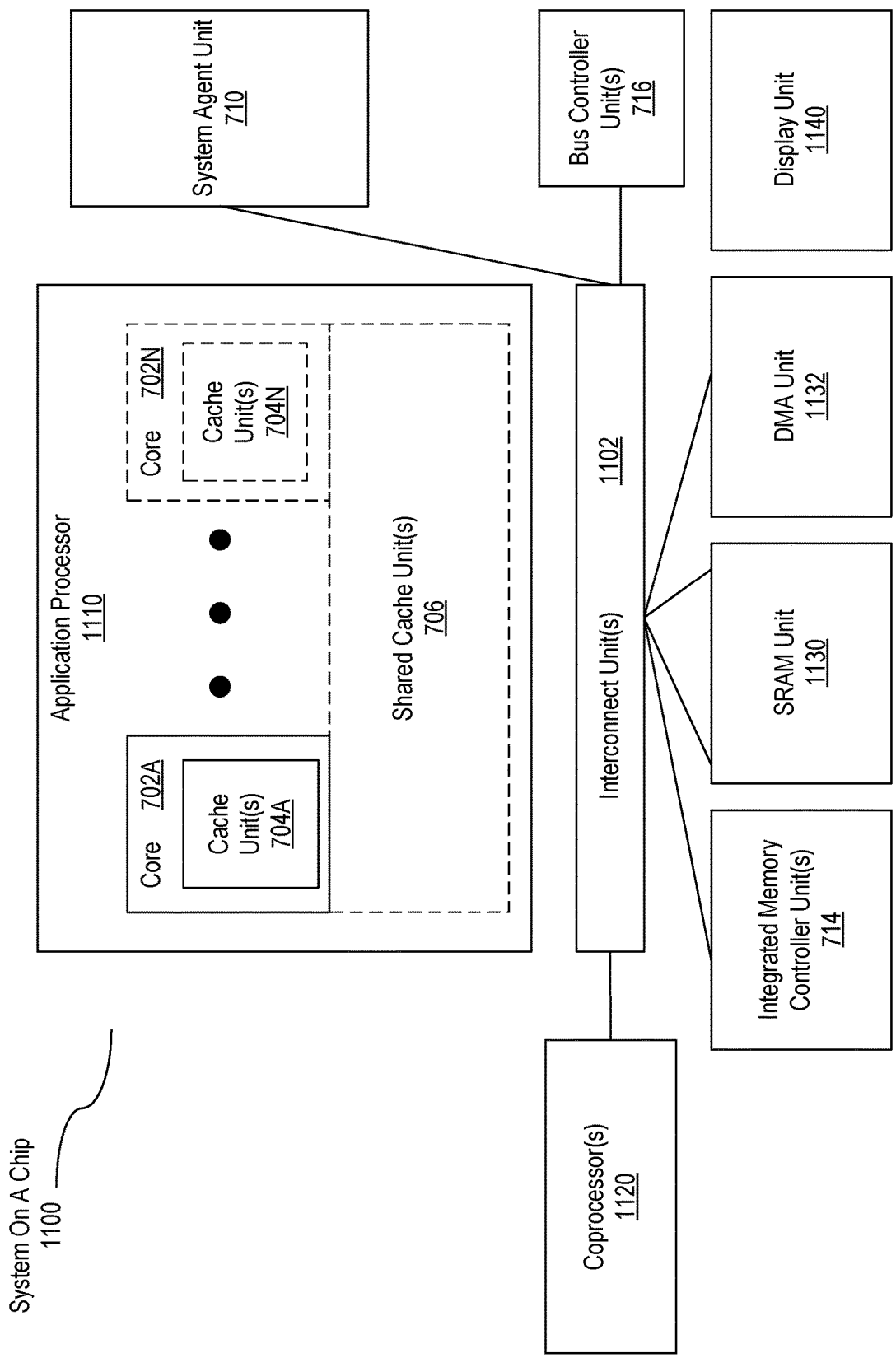
FIG. 11 is a block diagram of a SoC in accordance with disclosed embodiments.

Referring now to FIG. 11, shown is a block diagram of a SoC 1100 in accordance with an embodiment. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 702A-N, cache units 704A-N, and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; a static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code including non-serializing register write instructions of an ISA executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
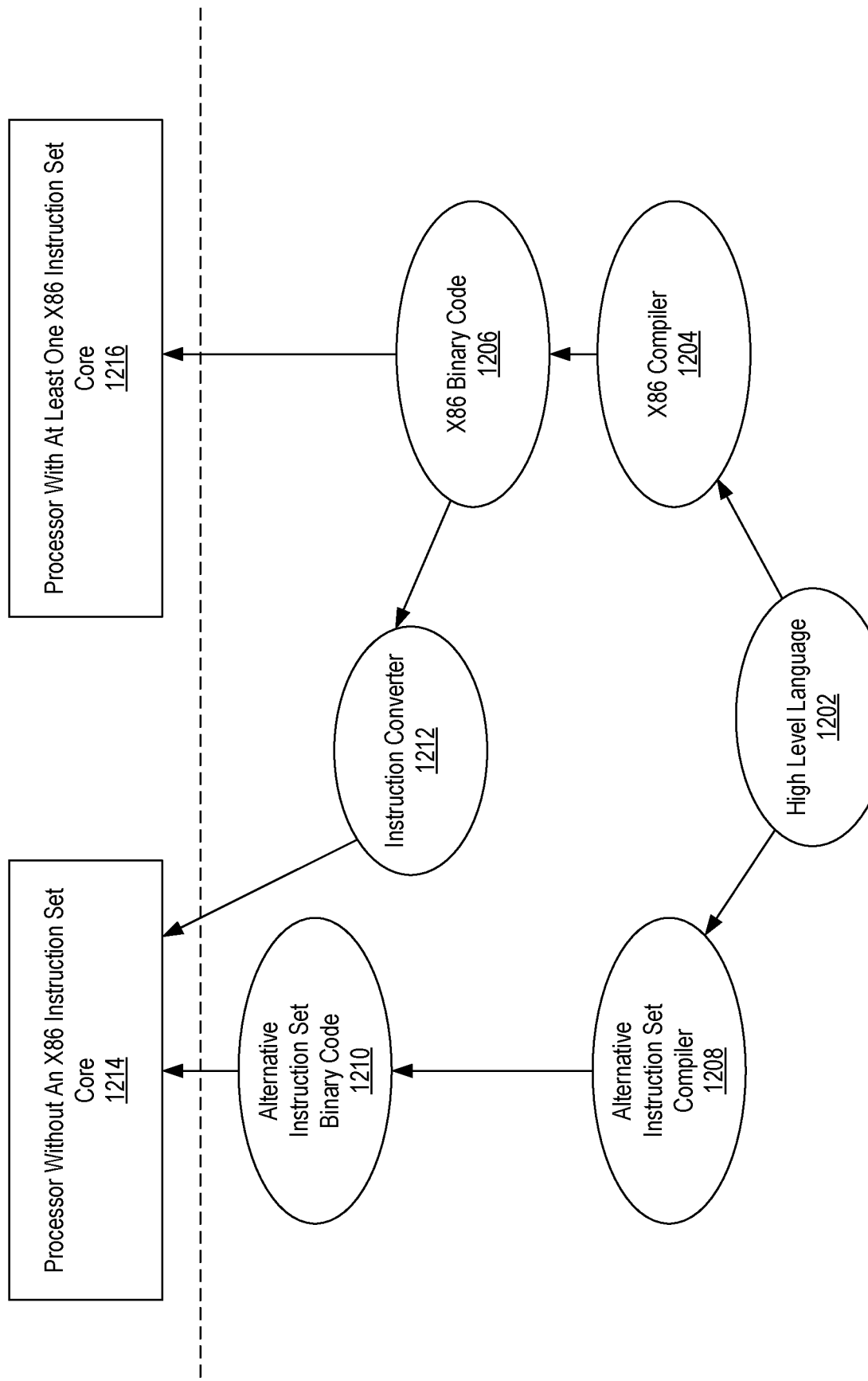
FIG. 12 is a block diagram contrasting the use of a software instruction converter to convert binary instructions in a source instruction set to binary instructions in a target instruction set according to disclosed embodiments.

FIG. 12 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first compiler 1204 to generate a first binary code (e.g., x86) 1206 that may be natively executed by a processor with at least one first instruction set core 1216. In some embodiments, the processor with at least one first instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 1204 represents a compiler that is operable to generate binary code of the first instruction set 1206 (e.g., object code) that can, with or without additional linkage processing, be executed on the processor with at least one first instruction set core 1216. Similarly, FIG. 12 shows the program in the high level language 1202 may be compiled using an alternative instruction set compiler 1208 to generate alternative instruction set binary code 1210 that may be natively executed by a processor without at least one first instruction set core 1214 (e.g., a processor with cores that execute the MIPS instruction set of MIPS Technologies of Sunnyvale, CA and/or that execute the ARM instruction set of ARM Holdings of Sunnyvale, CA). The instruction converter 1212 is used to convert the first binary code 1206 into code that may be natively executed by the processor without an first instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first instruction set processor or core to execute the first binary code 1206.

The following examples pertain to further embodiments.

In one example, an apparatus includes: a memory access controller to be coupled to a memory; and a memory management unit (MMU) coupled to the memory access controller, the MMU to: receive a memory transaction comprising an original transaction security attribute from a first device; responsive to the memory transaction comprising a first physical address of the memory, transmit the memory transaction to the memory access controller; and responsive to the memory transaction comprising a virtual address, generate a translated memory transaction comprising a translated physical address of the memory based on the virtual address and a translated transaction security attribute and transmit the translated memory transaction to the memory access controller, the translated physical address and the translated transaction security attribute associated with an operating system (OS) memory region of the memory associated with an OS.

In an example, the memory access controller is to enable the memory transaction to access the memory based on a determination that the first physical address corresponds to the original transaction security attribute, otherwise reject the memory transaction, the first physical address being associated with a first stolen memory region of the memory associated with the first device.

In an example, the memory access controller includes a storage to store a look up table comprising a first plurality of physical addresses associated with the first original transaction security attribute and corresponding to the first stolen memory region and a second plurality of physical addresses associated with a second original transaction security attribute and corresponding to a second stolen memory region of the memory associated with a second device.

In an example, the MMU includes an input/output MMU (IOMMU) and the MMU is to: receive the memory transaction comprising the physical address and the original transaction security attribute from the first device; and responsive to the memory transaction comprising the first physical address, bypass the IOMMU and transmit the memory transaction to the memory access controller.

In an example, the MMU includes an IOMMU coupled to a first trusted device translation lookaside buffer (TLB) associated with the first device, the first trusted device TLB is to: receive the memory transaction comprising the physical address and the original transaction security attribute from the first device; and responsive to the memory transaction comprising the first physical address, bypass the IOMMU and transmit the memory transaction to the memory access controller.

In an example, the memory access controller is to enable the translated memory transaction to access the memory based on a determination that the translated physical address corresponds to the translated transaction security attribute, otherwise reject the translated memory transaction.

In an example, the memory access controller includes a storage to store a look up table comprising a third plurality of physical addresses associated with the translated transaction security attribute and corresponding to the OS memory region, the third plurality of physical addresses including the translated physical address.

In an example, the MMU includes an IOMMU and the IOMMU is to: receive the memory transaction comprising the virtual address and the original transaction security attribute from the first device; determine whether the original transaction security attribute is valid; and generate the translated memory transaction comprising the translated physical address and the translated transaction security attribute based on the determination.

In an example, the MMU includes an IOMMU coupled to a first trusted device TLB associated with the first device, the first trusted device TLB is to: receive the memory transaction comprising the virtual address and the original transaction security attribute from the first device; based upon a determination that the translated physical address associated with the virtual address is stored at the first trusted device TLB, generate the translated memory transaction including the translated physical address and the translated transaction security attribute; and transmit the translated memory transaction to the memory access controller.

In an example, the MMU includes an IOMMU coupled to a first trusted device TLB associated with the first device, the first trusted device TLB is to: receive the memory transaction comprising the virtual address and the original transaction security attribute from the first device; issue a request for the translated memory transaction to the IOMMU; and receive the translated memory transaction comprising the translated physical address and the translated transaction security attribute from the IOMMU upon verification of the original transaction security attribute by the IOMMU.

In an example, the memory and the memory access controller are to be coupled via at least one of a network on chip (NoC) fabric, a memory fabric, and a memory bus.

In an example, the MMU includes an IOMMU coupled to a first trusted device TLB associated with the first device and the memory access controller comprises a first memory access control bridge coupled to the IOMMU and a second memory access control bridge coupled to the first trusted device TLB.

In an example, all translated memory transactions comprise the same translated transaction security attribute.

In an example, a fourth plurality of physical addresses of the memory are associated with a third stolen memory region of the memory and a third original transaction security attribute, the third stolen memory region associated with the first device.

In one example, a machine-readable medium includes instructions stored thereon, which if performed by a machine, cause the machine to: receive a memory transaction comprising a transaction security attribute and a physical address of a memory at a memory access controller from a MMU, the memory transaction associated with a first device; determine whether the physical address of the memory corresponds to one of at least one stolen memory region of the memory; based upon a determination that the physical address of the memory corresponds to a first one of the at least one stolen memory region, enable the memory transaction upon verification that the transaction security attribute enables access to the first one of the at least one stolen memory region, otherwise reject the memory transaction; and based upon a determination that the physical address of the memory does not correspond to the one of the at least one stolen memory region of the memory, enable the memory transaction upon verification that the transaction security attribute enables access to an OS memory region of the memory, otherwise reject the transaction.

In an example, the machine-readable medium includes instructions to cause the machine to only enable memory transactions generated by the first device to access the first one of the at least one stolen memory region.

In an example, the machine-readable medium includes instructions to cause the machine to enable the memory transaction upon verification that the transaction security attribute comprises a translated transaction security attribute generated by an IOMMU of the MMU.

In one example, a system includes a processor; a memory coupled to the processor, the memory to be allocated into a plurality of memory regions comprising a first stolen memory region associated with a first device and an OS memory region associated with an OS; a memory access controller coupled to the memory; and a MMU coupled to the memory access controller and comprising an IOMMU, the MMU to: receive a memory transaction comprising an original transaction security attribute from the first device; responsive to the memory transaction comprising a first physical address of the memory, bypass the IOMMU and transmit the memory transaction to the memory access controller; and responsive to the memory transaction comprising a virtual address, the IOMMU is to generate a translated memory transaction comprising a translated physical address of the memory based on the virtual address and a translated transaction security attribute upon verification of the original transaction security attribute and transmit the translated memory transaction to the memory access controller, the translated physical address and translated transaction security attribute associated with the OS memory region.

In an example, the memory access controller is to only allow the memory transaction comprising the first physical address of the memory and the original transaction security attribute to access the first stolen memory region and not allow the memory transaction to access the OS memory region.

In an example, the memory access controller is to only allow the translated memory transaction comprising the translated physical address and the translated transaction security attribute to access the OS memory region and not allow the translated memory transaction to access the first stolen memory region.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a memory access controller to be coupled to a memory; and
a memory management unit (MMU) coupled to the memory access controller, the MMU to:
receive a memory transaction comprising an original transaction security attribute from a first device;
responsive to the memory transaction comprising a first physical address of the memory, transmit the memory transaction to the memory access controller; and
responsive to the memory transaction comprising a virtual address, generate a translated memory transaction comprising a translated physical address of the memory based on the virtual address and a translated transaction security attribute and transmit the translated memory transaction to the memory access controller, the translated physical address and the translated transaction security attribute associated with an operating system (OS) memory region of the memory associated with an OS.

2. The apparatus of claim 1, wherein the memory access controller is to enable the memory transaction to access the memory based on a determination that the first physical address corresponds to the original transaction security attribute, otherwise reject the memory transaction, the first physical address being associated with a first stolen memory region of the memory associated with the first device.

3. The apparatus of claim 2, wherein the memory access controller comprises a storage to store a look up table comprising a first plurality of physical addresses associated with the first original transaction security attribute and corresponding to the first stolen memory region and a second plurality of physical addresses associated with a second original transaction security attribute and corresponding to a second stolen memory region of the memory associated with a second device.

4. The apparatus of claim 1 wherein the MMU comprises an input/output MMU (IOMMU) and the MMU is to:
receive the memory transaction comprising the physical address and the original transaction security attribute from the first device; and
responsive to the memory transaction comprising the first physical address, bypass the IOMMU and transmit the memory transaction to the memory access controller.

5. The apparatus of claim 1 wherein the MMU comprises an IOMMU coupled to a first trusted device translation lookaside buffer (TLB) associated with the first device, the first trusted device TLB is to:
receive the memory transaction comprising the physical address and the original transaction security attribute from the first device; and
responsive to the memory transaction comprising the first physical address, bypass the IOMMU and transmit the memory transaction to the memory access controller.

6. The apparatus of claim 1, wherein the memory access controller is to enable the translated memory transaction to access the memory based on a determination that the translated physical address corresponds to the translated transaction security attribute, otherwise reject the translated memory transaction.

7. The apparatus of claim 6, wherein the memory access controller comprises a storage to store a look up table comprising a third plurality of physical addresses associated with the translated transaction security attribute and corresponding to the OS memory region, the third plurality of physical addresses including the translated physical address.

8. The apparatus of claim 1 wherein the MMU comprises an IOMMU and the IOMMU is to:
receive the memory transaction comprising the virtual address and the original transaction security attribute from the first device;
determine whether the original transaction security attribute is valid; and
generate the translated memory transaction comprising the translated physical address and the translated transaction security attribute based on the determination.

9. The apparatus of claim 1 wherein the MMU comprises an IOMMU coupled to a first trusted device TLB associated with the first device, the first trusted device TLB is to:
receive the memory transaction comprising the virtual address and the original transaction security attribute from the first device;
based upon a determination that the translated physical address associated with the virtual address is stored at the first trusted device TLB, generate the translated memory transaction including the translated physical address and the translated transaction security attribute; and
transmit the translated memory transaction to the memory access controller.

10. The apparatus of claim 1 wherein the MMU comprises an IOMMU coupled to a first trusted device TLB associated with the first device, the first trusted device TLB is to:
receive the memory transaction comprising the virtual address and the original transaction security attribute from the first device;
issue a request for the translated memory transaction to the IOMMU; and
receive the translated memory transaction comprising the translated physical address and the translated transaction security attribute from the IOMMU upon verification of the original transaction security attribute by the IOMMU.

11. The apparatus of claim 1, wherein the memory and the memory access controller are to be coupled via at least one of a network on chip (NoC) fabric, a memory fabric, and a memory bus.

12. The apparatus of claim 1, wherein the MMU comprises an IOMMU coupled to a first trusted device TLB associated with the first device and the memory access controller comprises a first memory access control bridge coupled to the IOMMU and a second memory access control bridge coupled to the first trusted device TLB.

13. The apparatus of claim 1, wherein all translated memory transactions comprise the same translated transaction security attribute.

14. The apparatus of claim 1 wherein a fourth plurality of physical addresses of the memory are associated with a third stolen memory region of the memory and a third original transaction security attribute, the third stolen memory region associated with the first device.

15. A machine-readable medium comprising instructions stored thereon, which if performed by a machine, cause the machine to:
- receive a memory transaction comprising a transaction security attribute and a physical address of a memory at a memory access controller from a MMU, the memory transaction associated with a first device;
- determine whether the physical address of the memory corresponds to one of at least one stolen memory region of the memory;
- based upon a determination that the physical address of the memory corresponds to a first one of the at least one stolen memory region, enable the memory transaction upon verification that the transaction security attribute enables access to the first one of the at least one stolen memory region, otherwise reject the memory transaction; and
- based upon a determination that the physical address of the memory does not correspond to the one of the at least one stolen memory region of the memory, enable the memory transaction upon verification that the transaction security attribute enables access to an OS memory region of the memory, otherwise reject the transaction.

16. The machine-readable medium of claim 15, further comprising instructions to cause the machine to only enable memory transactions generated by the first device to access the first one of the at least one stolen memory region.

17. The machine-readable medium of claim 15, further comprising instructions to cause the machine to enable the memory transaction upon verification that the transaction security attribute comprises a translated transaction security attribute generated by an IOMMU of the MMU.

18. A system comprising:
- a processor;
- a memory coupled to the processor, the memory to be allocated into a plurality of memory regions comprising a first stolen memory region associated with a first device and an OS memory region associated with an OS;
- a memory access controller coupled to the memory; and
- a MMU coupled to the memory access controller and comprising an IOMMU, the MMU to:
  - receive a memory transaction comprising an original transaction security attribute from the first device;
  - responsive to the memory transaction comprising a first physical address of the memory, bypass the IOMMU and transmit the memory transaction to the memory access controller; and
  - responsive to the memory transaction comprising a virtual address, the IOMMU is to generate a translated memory transaction comprising a translated physical address of the memory based on the virtual address and a translated transaction security attribute upon verification of the original transaction security attribute and transmit the translated memory transaction to the memory access controller, the translated physical address and translated transaction security attribute associated with the OS memory region.

19. The system of claim 18, wherein the memory access controller is to only allow the memory transaction comprising the first physical address of the memory and the original transaction security attribute to access the first stolen memory region and not allow the memory transaction to access the OS memory region.

20. The system of claim 18, wherein the memory access controller is to only allow the translated memory transaction comprising the translated physical address and the translated transaction security attribute to access the OS memory region and not allow the translated memory transaction to access the first stolen memory region.

* * * * *